United States Patent [19]

Taylor

[11] 4,093,761

[45] June 6, 1978

[54] SHEET WITH BREAKAWAY LINE

[75] Inventor: Philip W. Taylor, Howell, Mich.

[73] Assignee: Taylor Industries, Inc., Howell, Mich.

[21] Appl. No.: 498,653

[22] Filed: Aug. 19, 1974

Related U.S. Application Data

[63] Continuation-in-part of Ser. No. 232,730, Mar. 8, 1972, abandoned.

[51] Int. Cl.² ............... B65D 65/28; G09F 3/00; B32B 3/04
[52] U.S. Cl. .................... 428/43; 174/72 A; 428/122; 428/126; 428/127; 428/130; 428/192; 428/358
[58] Field of Search ............... 161/100, 110, 116, 118, 161/130, 149; 174/101, 72 A; 428/43, 122, 126, 127, 130, 192, 358

[56] References Cited

U.S. PATENT DOCUMENTS

| 3,126,444 | 3/1964 | Taylor | 174/101 |
| 3,706,173 | 12/1972 | Taylor | 161/100 |

FOREIGN PATENT DOCUMENTS

| 229,394 | 9/1963 | Austria | 174/72 A |
| 1,352,504 | 1/1964 | France | 174/72 A |

Primary Examiner—William R. Dixon, Jr.
Attorney, Agent, or Firm—Hauke & Patalidis

[57] ABSTRACT

A sheet of extruded material is provided with a breakaway line by positioning a pin in the extrusion die in a manner such that the pin extends into the path of the material being extruded to divide a portion of the material into two streams which rejoin each other past the pin and weld together to form an autogenous bond between the converging surfaces. In a preferred embodiment the breakaway line is present in the sides of a U-shaped channel of the type used as a duct for electrical wiring.

3 Claims, 7 Drawing Figures

U.S.Patent  June 6, 1978  4,093,761
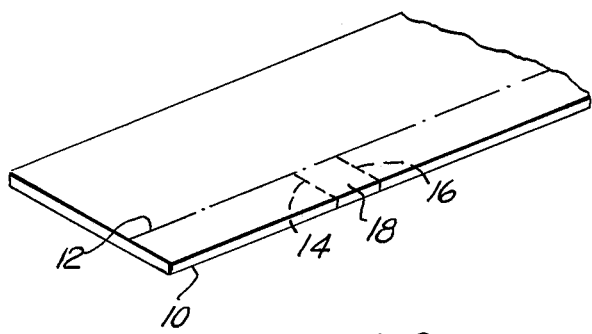
FIG. 1
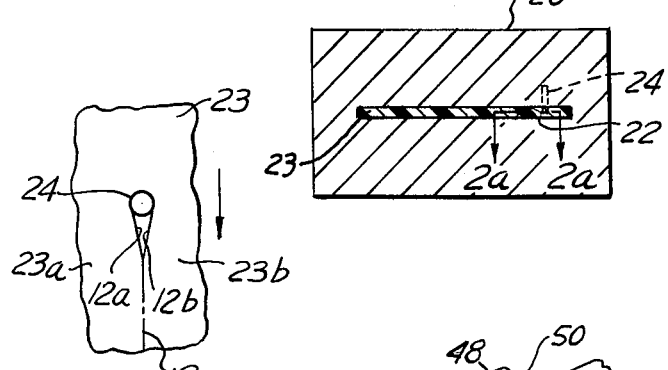
FIG. 2
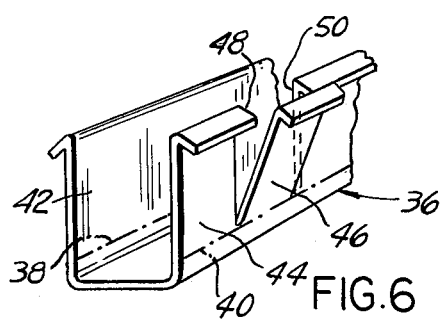
FIG. 2a
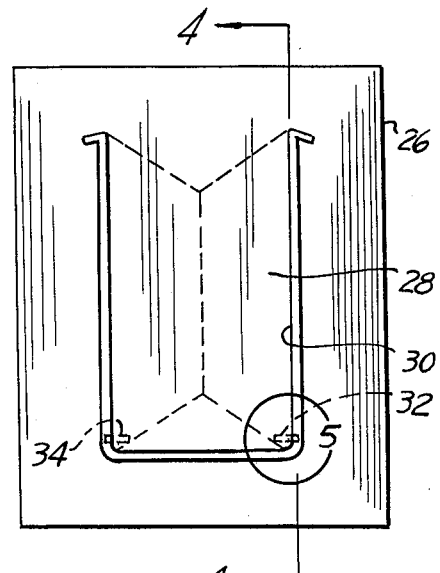
FIG. 3
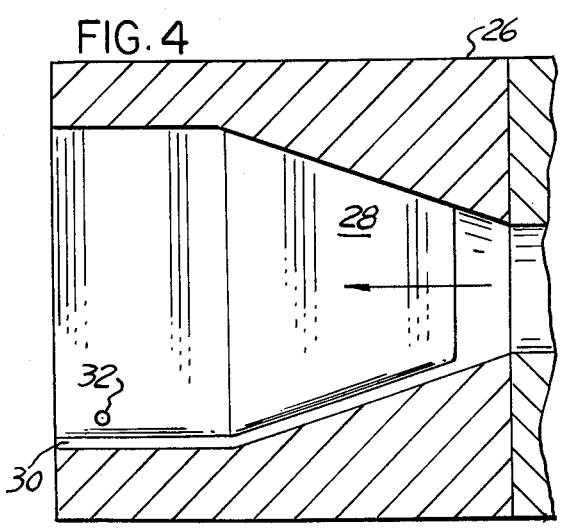
FIG. 4
FIG. 6
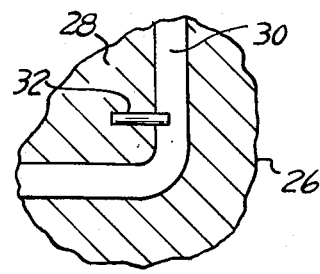
FIG. 5

SHEET WITH BREAKAWAY LINE

REFERENCES TO RELATED APPLICATIONS

The present application is a continuation-in-part of application Ser. No. 232,730, filed Mar. 8, 1972 now abandoned.

BACKGROUND OF THE INVENTION

It has become common practice to contain groups of parallel extending electrical wires within extruded U-shaped channels, or ducts. However, electricians, seeking to make electrical connections between one or more of such wires and a point outside the duct, have run into the rather exasperating and time consuming problem of making an opening in the sides of the duct. Shears, for example, can readily make cuts which are perpendicular to the top edge of the duct, but it is extremely awkward to make a cut parallel to the top edge with shears. It is therefore desirable to provide a breakaway line along the bottom of each side of the duct and parallel to the top edge. With such a line, the electrician can make two parallel cuts with shears and then snap out a section of the side of the duct along the breakaway line.

SUMMARY OF THE INVENTION

The invention deals with a sheet of material having a breakaway line along an autogenous bond of surfaces of said material. In a preferred embodiment of the invention two such sheets, each having a breakaway line, form the sides of said a U-shaped channel or duct for containing electrical wires.

In the method of the invention extrudable material, preferably a thermoplastic, is first passed through an extrusion die past one or more pins extending into the material transversely to the flow thereof and in a manner to divide a portion, or portions, of the material into two streams. The separated streams then converge toward each other and rejoin to form an autogenous bond of the converging surfaces. The extrusion process is completed, or terminated, when a weak autogenous bond has formed which is strong enough to hold the material together under normal stress. However, the extrusion process is terminated before the material becomes so intimately mixed as to obliterate the autogenous bond and to reform a substantially homogenous mass.

In this latter connection, I am aware that "spider" supports; that is, pins or rods, are used to support a die mandrel in a die housing. To the best of my knowledge, however, these pins have always been positioned in a manner to permit the substantially complete homogenization of the extruded material after it has flowed past the supports.

DESCRIPTION OF THE DRAWINGS

FIG. 1 is a perspective view of a sheet of material provided with the breakaway line of the invention;

FIG. 2 is a cross-sectional view of an extrusion die suitable for the extrusion of the sheet of FIG. 1;

FIG. 2a is an enlarged fractional view along line 2a—2a of FIG. 2;

FIG. 3 is an elevation view of the end of an extrusion die suitable for extruding a U-shaped channel structure which includes a preferred embodiment of the invention;

FIG. 4 is a view of FIG. 3 along the line 4—4;

FIG. 5 is an enlarged cross-sectional view of the indicated portion of FIG. 3 to show more clearly the stream dividing pin of the invention; and FIG. 6 is a perspective view of an extruded duct illustrating the removal of a portion of a side wall along a breakaway line.

DESCRIPTION OF THE PREFERRED EMBODIMENT

FIG. 1 shows a sheet 10 provided with a breakaway line 12. Although the line 12 is illustrated in phantom line as visible for purposes of illustration, the line, in an actual structure, is generally not visible except under the most careful scrutiny. Dashed lines 14,16 represent, for purposes of illustration, lines along which the sheet may be sheared prior to breaking away a piece 18.

In FIG. 2 an extrusion die 20 is shown provided with an orifice 22 through which an appropriate material, such as a thermoplastic 23 heated such as to be of sufficient viscosity, is caused to flow under pressure in order to extrude the sheet 10 of FIG. 1. A pin 24 extends from a wall of the die 20 at least part of the way into the orifice 22 and is thus disposed transversely to the flow of the material being extruded.

In FIGS. 3, 4 and 5 an extrusion die 26 is shown provided with a mandrel 28 defining a cavity 30 suitable for extruding a U-shaped channel structure. Pins 32,34 extend outwardly from the wall of the mandrel 28 at least partly into the cavity 30, transversely to the stream of plastic material flowing through the cavity 30 of the die 26.

FIG. 6 shows a preferred embodiment of the invention, a duct for containing electrical wiring (not shown). Breakaway lines 38,40 are formed in side walls 42,44. A piece 46 of side wall 44, as shown, has been sheared along edges 48,50 from the top downwardly to breakaway line 40. As shown, the piece 46 has been deflected outwardly and is about to snap at breakaway line 40.

DESCRIPTION OF OPERATION

A plastic material suitable for extrusion, preferably a thermoplastic 23, is hot extruded through a die, such as die 20 of FIG. 2, to form the sheet 10 of FIG. 1. As the plastic material 23 is extruded through the orifice 22 in the die 20 past the pin 24 (FIGS. 2 and 2a), a portion of the material 23 is divided into two streams 23a and 23b (FIG. 2a). When the material has passed the pin 24, the two streams 23a and 23b come together again and unite with each other to form an autogenous bond along line 12 between the converging surfaces 12a and 12b of the material 23. The pin 24 may extend all the way through the orifice 22 or only part of the way, as illustrated at FIG. 2, according to how weak a breaking line is desired. The bond, after suitable contact of the surfaces 12a and 12b, is strong enough to hold the surfaces together as the material 23 solidifies during cooling and continuously emerges from the die. However, cooling of the material during the extrusion process to an almost solid state must be terminated before intimate mixing of the two streams obliterates the autogenous boundary between the engaged surfaces 12a and 12b of the two streams 23a and 23b and causes the material to be reformed into a substantially homogenous mass.

Termination of the extrusion process, following the formation of such an autogenous bond but before the obliteration of the boundary between the two streams, leaves the finished sheet 10 with a relatively weak breakaway line 12 parallel to the long edges of the sheet (as shown in FIG. 1).

To break away a portion of the sheet, one shears the material along the lines 14,16 to the breakaway line 12 and then snaps the piece 18 out of the sheet 10 along the line 12 by pressing downwardly on the piece 18.

Similarly, in forming a U-shaped channel structure, or duct for electric wiring, a thermoplastic is hot extruded under pressure past the pins 32,34 (FIGS. 4, 5, 6), each of the pins dividing a portion of the plastic mass flowing past the pins into two streams. The two streams then rejoin each other within the extrusion die 26. Pins 32,34 are positioned between the inlet and outlet of the extrusion die 26 such that there is sufficient time during the extrusion process to permit the separated streams of plastic material to come together to form an autogenous bond between the converging surfaces, but not sufficient time to permit the obliteration of such a bond by further mixing of the separated streams. Portions of the side walls 42,44 of the duct 36 (see FIG. 6) can be removed in the same manner as described in connection with FIG. 1; that is, two spaced parallel cuts 48,50 are made from the top edge of the duct 36 down to the breakaway line 40, and the piece 46 of the duct between the cuts is removed by bending it sharply at the breakaway line.

As previously mentioned, the breakaway line 12 (FIG. 1), or 38,40 (FIG. 6) is non-apparent, for all practical purposes, except that under the most careful scrutiny a very slight difference in skin appearance may be noticeable at the line between the material along the line and the material of the remaining of the sheet 10 or of the side walls 42,44 of the channel 36. The wall thickness of the sheet or of the side wall at the line is the same as the wall thickness of the remaining of the sheet or of the side wall. It will be appreciated that the breakaway line results apparently from reduced elasticity of the material which causes the material to break along the line when the sheet 10 or the side wall 42 or 44 is flexed beyond a certain limit in a direction generally parallel to the breakaway line.

It will be apparent to one skilled in the art to which the invention pertains that various changes and modifications may be made therein without departing from the spirit of the invention or the scope of the appended claims.

I claim:

1. A sheet of extruded plastic material having a breakaway line disposed substantially parallel to an edge of said sheet, said sheet being of substantially constant thickness and said breakaway line being a non-apparent line of reduced elasticity along an autogenous weakened bond of said plastic material, said breakaway line being formed during extrusion of said sheet by causing the flow of plastic material to separate and rejoin along said line.

2. The sheet of extruded plastic material of claim 1 wherein said sheet is in the form of a U-shaped channel structure having a base portion and a pair of substantially parallel side walls integral with said base portion, and wherein at least one of said side walls is of said substantially constant thickness from bottom to top and has said breakaway line of reduced elasticity parallel to the top edge of said side wall proximate the base portion of said channel.

3. The sheet of extruded plastic material of claim 2 wherein each of said side walls is of said substantially constant thickness and has said breakaway line.

* * * * *